No. 710,306. Patented Sept. 30, 1902.
G. W. TODD.
RUBBER DAM HOLDER.
(Application filed June 16, 1902.)

(No Model.)

WITNESSES:

F. J. Larson.

W. E. Windsor.

INVENTOR

George Washington Todd

BY Geo. W. Sues, Attorney

UNITED STATES PATENT OFFICE.

GEORGE WASHINGTON TODD, OF ELMWOOD, NEBRASKA, ASSIGNOR OF ONE-THIRD TO HANS PETER JENSEN, OF OMAHA, NEBRASKA.

RUBBER-DAM HOLDER.

SPECIFICATION forming part of Letters Patent No. 710,306, dated September 30, 1902.

Application filed June 16, 1902. Serial No. 111,908. (No model.)

*To all whom it may concern:*

Be it known that I, GEORGE WASHINGTON TODD, residing at Elmwood, in the county of Cass and State of Nebraska, have invented certain useful Improvements in Rubber-Dam Holders; and I do hereby declare that the following is a full, clear, and exact description of the invention, such as will enable others skilled in the art to which it appertains to make and use the same, reference being had to the accompanying drawings, which form a part of this specification.

This invention relates to an improvement in rubber-dam holders.

The aim of my invention is to provide a dental appliance adapted to removably receive a rubber dam comprising a supporting-frame, to which the rubber dam is adapted to be secured, said frame having a plurality of pivotally-held tooth-clamps, which also assist in supporting the rubber dam, the whole structure being adapted to be secured to the patient's teeth in such a manner as to provide a water-tight receptacle, through the bottom of which one or more of the teeth project, as will be described more fully hereinafter.

Figure 1:
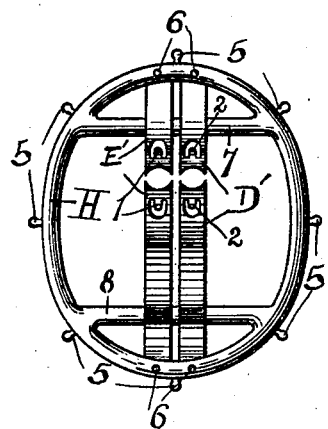
Figure 2:
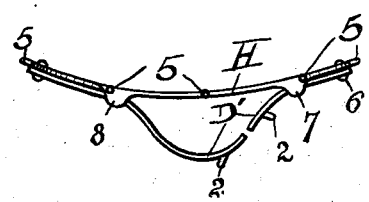

In the accompanying drawings I have shown in Figure 1 a top view of a rubber-dam holder embodying my invention, while Fig. 2 shows a side view thereof.

The rubber-dam holder disclosed in my present invention is more particularly adapted to be used in filling front teeth, and in carrying out the object of my invention I provide a frame H, preferably of spring sheet metal, which frame is preferably oval, as is shown in Fig. 1, and is provided with a plurality of pins 5, adapted to receive the rubber dam to be stretched over this holder. At opposite points this holder H is provided with the transverse bars 7 and 8, as clearly shown in Fig. 1, while extending from the frame adjacent these transverse bars are the pivotally-supported tooth-clamps E' and D', these tooth-clamps being used in sets of twos and being pivotally supported by means of the pins 6. It will be noticed that the rear set of tooth-clamps comprises a short tooth, as those disclosed as passing over the transverse bar 7, and a long tooth, as those shown as extending from the transverse bar 8 in Fig. 1. The shorter teeth are curved slightly downward and are provided with the projecting lips 1 and 2, while the longer spring-teeth extending over the bar 8 are slightly curved or J-shaped, as is shown in Fig. 2, so that the teeth clamped between the sets of tooth-clamps may be projected in a line almost parallel to the holder H, which holder, it will be noticed, is slightly dished or curved, as shown in Fig. 2. The transverse bars 7 and 8 preferably form an integral part of the frame 8, as disclosed in the drawings. In securing these spring tooth-clamps they are so positioned that they are held upon the transverse bars 7 and 8 under spring tension, but are pivotally supported, so that the sets of arms may be shifted away from one another, so that the tooth-clamps can be easily secured to teeth whether they are near together or wide apart.

In the use of my rubber-dam holder the operator would secure a perforated rubber dam to the frame or holder H in securing the perforated dam by means of the pins 5. At two points between the sets of spring tooth-clamps, as E' and D', the rubber dam would be given three perforations, the central perforation coming midway between the sets of tooth-clamps and the remaining perforations coming in alinement with the projecting lips 1 and 2. The holder would then be secured to the teeth in such a manner that the transverse bar 8 would come in an upright position, the transverse bar 7 being vertically below the same, so that a dish were provided having a rubber bottom, through the center of which the teeth would project. In securing the holder and dam to the teeth the operator would insert the ends of a pair of pliers into the openings adjacent the lips 1 and 2 to spread one set of tooth-clamps apart sufficiently so that the tooth-clamps would readily pass over the tooth to be filled. In forcing these teeth apart the operator would of course also distend or stretch the rubber dam, as the same is secured by means of the lips 1 and 2, so that the opening within that dam would be enlarged, so that the dam would readily slide over the tooth. As soon as the rubber-dam holder has been given a proper position the operator would insert a blunt-ended pin through the openings adjacent the lips 1 and 2, so that the rubber would be forced off of the lips 1 and 2 and clamped below the same about the tooth to form a water-tight union and prevent the entry of any saliva into the receptacle formed by the dished dam, so that the teeth may be operated upon in a dry condition.

The patient can readily swallow and breathe while the rubber-dam holder is in position.

These rubber-dam holders may be made of various sizes and of suitable material, and,

Having thus described my said invention, what I claim as new, and desire to secure by United States Letters Patent, is—

1. The combination with a suitable frame provided with two transverse bars, of a plurality of tooth-clamps extending from said frame and pivotally secured thereto and working over said transverse bars.

2. The combination with a suitable spring-frame provided with two transverse bars at opposite ends, of a plurality of tooth-clamps pivotally secured to said frame and working over said transverse bars, each tooth-clamp being provided with an upwardly-extending lip and an opening adjacent said lip.

In testimony whereof I affix my signature in presence of two witnesses.

GEORGE WASHINGTON TODD.

Witnesses:
GEORGE W. SUES,
HANS P. JENSEN.